United States Patent [19]

McDavid

[11] Patent Number: 5,001,727
[45] Date of Patent: Mar. 19, 1991

[54] CARRIER AND DATA RECOVERY AND DEMODULATION SYSTEM

[75] Inventor: William T. McDavid, Richardson, Tex.

[73] Assignee: Terra Marine Engineering, Inc., Garland, Tex.

[21] Appl. No.: 311,145

[22] Filed: Feb. 15, 1989

[51] Int. Cl.$^5$ .......................................... H04L 27/18
[52] U.S. Cl. ..................................... 375/80; 329/306; 455/214
[58] Field of Search ....................... 375/39, 52, 54, 80, 375/81, 82, 85, 86, 97, 113; 329/50, 104, 105, 122, 112, 124; 370/93, 108; 455/205, 214

[56] References Cited

U.S. PATENT DOCUMENTS

| | | | |
|---|---|---|---|
| 3,806,815 | 4/1974 | Fletcher et al. | 375/81 |
| 4,317,210 | 2/1982 | Dekker et al. | 375/80 |
| 4,361,894 | 11/1982 | Kurihara et al. | 329/122 |
| 4,466,108 | 8/1984 | Rhodes | 375/73 |
| 4,527,278 | 7/1985 | Deconche et al. | 375/97 |
| 4,560,941 | 12/1985 | Welles, II et al. | 375/82 |
| 4,577,157 | 3/1986 | Reed | 375/82 |
| 4,591,797 | 5/1986 | Tanimoto et al. | 329/50 |
| 4,794,623 | 12/1988 | Levesque et al. | 375/81 |

Primary Examiner—Douglas W. Olms
Assistant Examiner—Stephen Chin
Attorney, Agent, or Firm—Ross, Howison, Clapp & Korn

[57] ABSTRACT

A modulated carrier is received on a node (10) and then the I- and the Q-channels extracted with a local carrier clock (16) that is free-running relative to the modulated carrier. The I- and the Q-channels are then input to a digital signal processor (26) wherein a composite phase signal is generated representing the phase difference between the modulated carrier and the local carrier clock (16). The composite phase is output from a lookup table in an EPROM (30) and then the free-running phase the local carrier clock (16) and the modulated carrier is discriminated from the composite phase. The free-running phase is then subtracted from the composite phase to yield the phase modulation on the carrier.

17 Claims, 11 Drawing Sheets

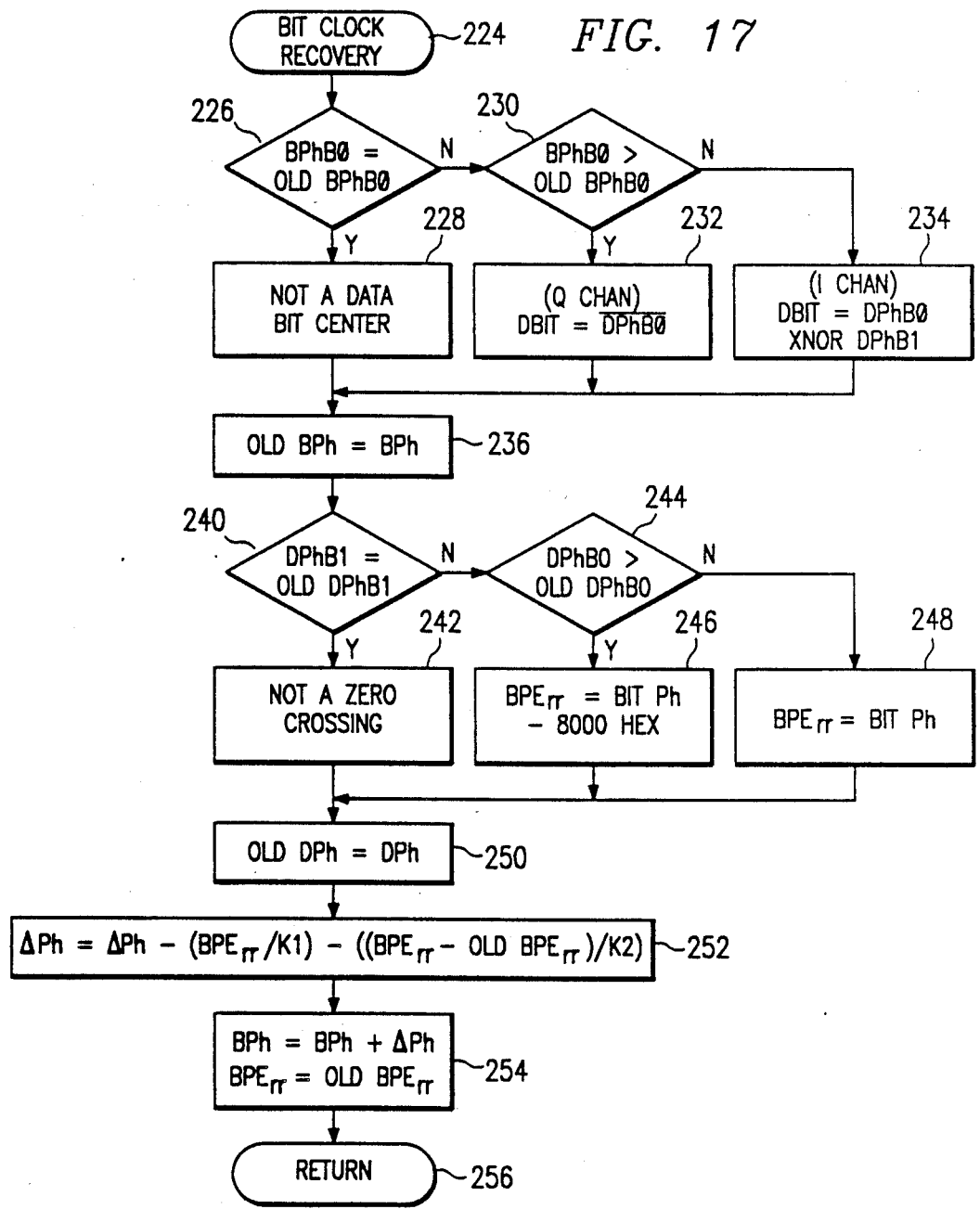

CARRIER AND DATA RECOVERY AND DEMODULATION SYSTEM

TECHNICAL FIELD OF THE INVENTION

The present invention pertains in general to carrier demodulation and, more particularly, to a system for demodulating the carrier and recovering the bit clock.

BACKGROUND OF THE INVENTION

Carrier demodulation typically requires a local oscillator that is locked to the frequency of the carrier signal over which data is transmitted. Using the local oscillator as a reference, the data is then demodulated from the carrier frequency. In typical systems, such as phase modulated systems, this is accomplished by comparing the phase of the local oscillator to the phase of the carrier and generating a phase error signal. This phase error signal is then fed back to the local oscillator to provide a correction therefore. Once the phase error between the received carrier and the local oscillator is corrected for, the phase modulation on the carrier can be received.

In one type of conventional phase modulation system, a QPSK system, the phase is modulated onto the carrier on I- and Q-channels. The modulated carrier is then downconverted to a zero frequency and the I- and the Q-channels separated. The I- and Q-channels are then passed through a standard demodulation circuit to generate a phase error voltage. This phase error voltage is filtered and fed back to the local oscillator to provide the feedback leg of a phase lock loop. Once phase lock is attained, the phase modulation can be recovered by conventional methods. However, prior to obtaining lock, the phase relationship is a combination of the free-running phase difference between the transmitted carrier and the local oscillator and the phase modulation on the carrier. Discrimination between these two components of phase is difficult in that some phase reference must initially be found by which to compare the unlocked phase difference and, therefore, some type of phase lock system is required.

One disadvantage with conventional demodulators is their lack of versatility and the complexity thereof. For systems that require a very narrow bandwidth and may therefore have significant intersymbol interference and jitter, conventional phase demodulators may not be sufficient. This requires a custom demodulator that must be altered each time the parameters or specifications for a given demodulation scheme change. Another disadvantage to conventional demodulators is that they do not lend themselves to realization with a digital signal processor wherein the information contained in the received carrier would be converted into a digital value with this digital value processed through the digital signal processor in accordance with a given algorithm. The present demodulation systems are primarily realized with analog circuits.

Another disadvantage of conventional systems is that they must obtain carrier lock and bit lock before data recovery can begin. Therefore, initial data is lost and output of data cannot begin until lock is achieved. For security reasons, some communication systems allow carrier transmission for only a short time during which lock must be achieved. As the lock time for these systems increases, the amount of data that can be transmitted decreases.

SUMMARY OF THE INVENTION

The present invention disclosed and claimed herein comprises a method and apparatus for demodulating a phase modulated carrier and also a phase/amplitude modulated carrier. The system first receives a phase modulated carrier with the phase modulated carrier operating at first frequency. A local carrier clock is then generated and operating at a second frequency. The second frequency is proximate in frequency to the first frequency. The phase difference between the phase modulated carrier and the local carrier clock is then determined which provides a composite phase signal. This composite phase signal is made up of the phase modulation of the phase modulation signal carrier and the free-running phase difference between the unmodulated carrier and the local carrier clock. The free-running phase difference is then discriminated from the composite signal to provide a phase error signal. This phase error signal is then subtracted from the composite phase error signal to yield the phase modulation on the phase modulated carrier. The data therein can then be extracted.

In yet another embodiment of the present invention, the phase modulation on the phase modulated carrier is utilized to generate a bit clock. The bit clock is generated by first generating a local bit clock at the receiver. Data transitions corresponding to clock edges in the bit clock are then discriminated from the demodulated phase information. The value of the bit clock is then compared with the expected value and an error generated. The local bit clock has a frequency thereof adjusted in order to compensate for this error.

In yet another aspect of the present invention, the generation of the composite phase and the discrimination of the free-running phase is achieved with a digital signal processor. Therefore, the digital signal processor is programmed to determine the phase modulation on the phase modulated carrier without locking the frequency of the local carrier clock to the frequency of the modulated carrier.

BRIEF DESCRIPTION OF THE DRAWINGS

For a more complete understanding of the present invention and the advantages thereof, reference is now made to the following description taken in conjunction with the accompanying Drawings in which:

FIG. 17 illustrates a flow chart for the bit clock recovery scheme;

Figure 1:
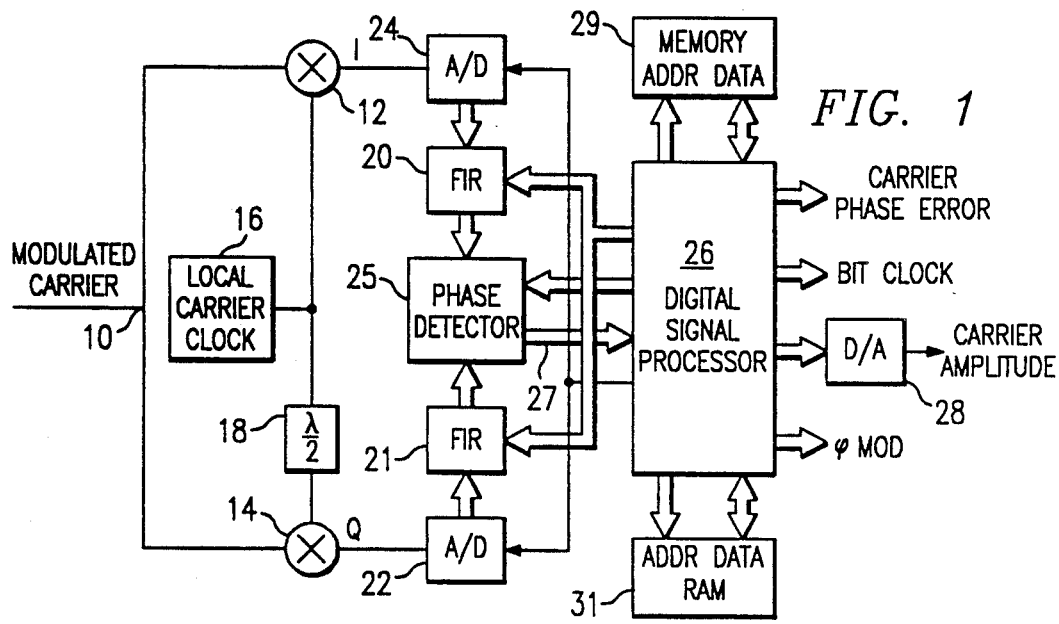
FIG. 1 illustrates a general block diagram of the demodulation system utilizing the digital signal processor.

It will be appreciated that for purposes of clarity and where deemed appropriate, reference numerals have been repeated in the figures to indicate corresponding features in order to more clearly show important features of the present invention.

DETAILED DESCRIPTION OF THE INVENTION

Referring now to FIG. 1, there is illustrated a block diagram of the demodulation system of the present invention. A phase modulated carrier is received on an input line 10. In the preferred embodiment, the modulated carrier on line 10 is at a frequency of approximately 100 KHz. This is derived by downconverting a 74 MHz carrier to an intermediate frequency of 10.7 MHz and then to 100 KHz (with circuitry not shown), thus providing a double conversion system. The modulated carrier is input to a first mixer 12 and also to a second mixer 14. A local carrier clock 16 is provided which operates at a frequency that is relatively close to the down converted carrier clock at the transmitter end. The local carrier clock 16 at the receiver end, in the preferred embodiment, is within approximately 200 Hz of the transmitted carrier clock such that the output of the mixers 12 and 14 is downconverted to a relatively low frequency approaching zero.

The local carrier clock 16 is input to the local oscillator input of the mixer 12 and also to the input of a 90° phase shift circuit 18, the output of which is input to the local oscillator input of the mixer 14. The output of mixers 12 and 14 therefore provides quadrature phase components that constitute the I-channel and the Q-channel of the demodulated system. Up to this point, this is conventional circuitry. It should be understood that the local carrier clock 16 can be divided down from a higher and more stable clock and the modulated carrier could also be a downconverted carrier such that the conversion to the I- and the Q-channel is done at an intermediate frequency.

After deriving the I- and the Q-channel signal, the Q-channel signal is input to the input of an analog-to-digital (A/D) converter 22. In a similar manner, the I-channel signal is input to an A/D converter 24. The output of the A/D converter 22 is input to a finite impulse response (FIR) filter 20 and the A/D converter 24 is input to a FIR filter 21. The outputs of FIR filters 20 and 21 are input to a phase detector 25 that converts the digital value of the I-channel and the digital value of the Q-channel to the arctangent of quotient of the two values yielding the composite phase. The composite phase is then input to a digital signal processor (DSP) 26 on a bus 27. The DSP 26 is operable to determine the free-running phase difference between the local carrier clock 16 and the modulated carrier on input node 10. The free-running phase difference is essentially the absolute phase difference between the local carrier clock and an unmodulated carrier and establishes a carrier phase error. This carrier phase error can then be subtracted from the composite phase which is derived from the I- and the Q-channels to provide the phase modulation on the carrier. This provides a demodulation scheme without requiring actual synchronization of the local carrier clock 16 to the received carrier.

The DSP 26 is interfaced with a memory 29 that is operable to store FIR coefficients for the filters 20 and 21 and also look up tables. The memory 29 is typically comprised of an EPROM. In addition, the DSP 26 has volatile RAM memory 31 associated therewith to temporarily store data for output therefrom. The RAM 31 is also utilized for the general operation of the DSP 26. The DSP 26 is interfaced with the A/D converters 22 and 24, the FIR filters 20 and 21 and the phase detector 25 through various control lines and buses.

The DSP 26 and phase detector 25 are operable to generate the carrier phase error for output therefrom, recover and output the bit clock, and recover the phase modulation on the modulated carrier. In addition, the digital signal processor is operable to output the amplitude of the carrier which is then converted to a digital value by a digital-to-analog (D/A) converter 28. This amplitude information can be utilized in phase modulation schemes such as Quadrature Amplitude Modulation (QAM) and also for Automatic Gain Control (AGC) of the Intermediate Frequency (IF) amplifier if utilized.

During operation in the preferred embodiment, the DSP 26 is operable to demodulate the carrier and recover the phase information contained therein when the modulated carrier and the local carrier clock 16 are within approximately 200 Hz of each other. However, when the modulated carrier deviates in frequency more than 200 Hz from the local carrier clock 16, the system is operable to transmit information back to the transmitter by a separate communication path to effect a course adjustment at the transmitter. To make this determination, the carrier phase error is compared with a reference and, if it exceeds this reference, this indicates that a course adjustment is necessary, which information is then carried out at the transmitter end. The DSP 26 utilizes a Digital Signal Processor, Part No. DSP56001, manufactured by Motorola.

Figure 2A:
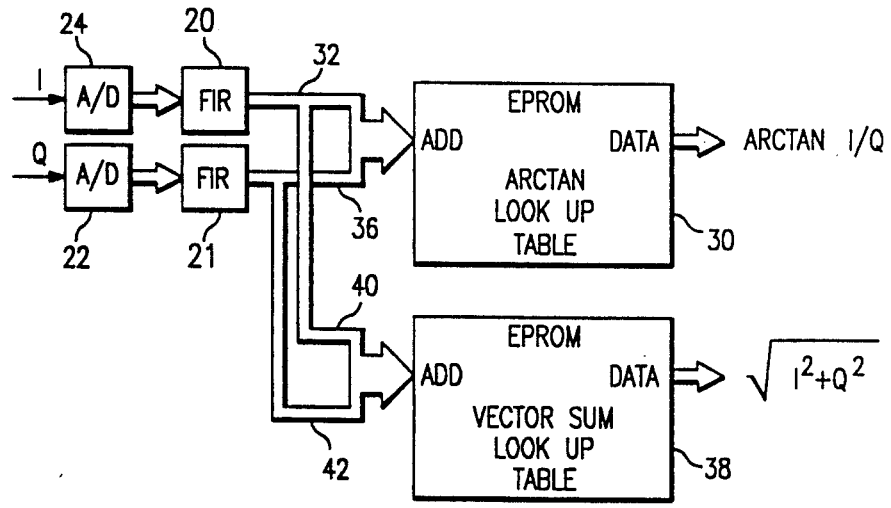
FIG. 2a illustrates a logic block diagram for generating the composite phase.

Referring now to FIG. 2a, there is illustrated a block diagram of the phase detector 25 utilized to derive the composite phase and also the amplitude of the carrier. In the preferred embodiment, the output of the A/D converter 24 for the I-channel is input to one-half of the address input on an EPROM 30 through a bus 32, the EPROM 30 being part of the memory 29. In a similar manner, the output of the A/D converter 22 is input to the other half of the address on the EPROM 30 through a bus 36. The EPROM 30 is operable to store a look-up table for the arctangent of the value "I/Q" (arctan I/Q). This is the phase difference between the modulated carrier and the local carrier clock. In general, the data is organized such that the combination of the digital value of the I-channel signal and the digital value of the Q-channel signal provide the address of the corresponding value of the arctan I/Q. The EPROM 30 is realized with a memory, Part No. 27C512, manufactured by Texas Instruments, Inc.

The amplitude of the carrier is defined as the square root of the sum of the squares of the I-channel signal and the Q-channel signal and is provided by a second EPROM 38. The EPROM 38 operates similar to the EPROM 30 in that the first half of its address is derived from the digital value on the output of the A/D converter 24 for the I-channel on a bus 40 and the second half of the address is derived from the digital value on the output of the A/D converter 22 for the Q-channel and is received on a bus 42. The data output from the EPROM 38 provides the amplitude of the carrier. For phase modulation systems such as QPSK, all that is required is the phase information. However, for modulation systems such as Quadrature Amplitude Modulation (QAM), the amplitude of the carrier is also needed.

Figure 2B:
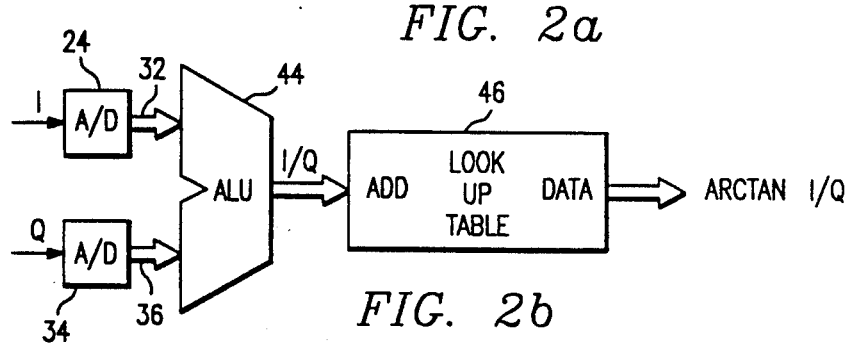
FIG. 2b illustrates an alternate embodiment for generating the composite phase signal.

Referring now to FIG. 2b, there is illustrated an alternate method for deriving the composite phase information. The output of the A/D converter 24 on bus 32 is input to an Arithmetic Logic Unit (ALU) 44 with the output of the A/D converter 34 on the Q-channel also being input to the ALU 44 on the bus 36. The ALU 44 is operable to generate the value "I/Q" which is then input to the address input of a look-up table 46 that is similar to the EPROMs 30 and 38. This provides the arctangent of "I/Q". The system of FIG. 2b provides for a higher resolution. Although not shown, a similar ALU could be utilized to perform the sum of the squares with the square root of the sum of the squares being stored in a look-up table. Of course, if a fast enough ALU were available, the ALU could be utilized to directly calculate the ATAN, squares and square roots and no memory would be required.

Figure 3:
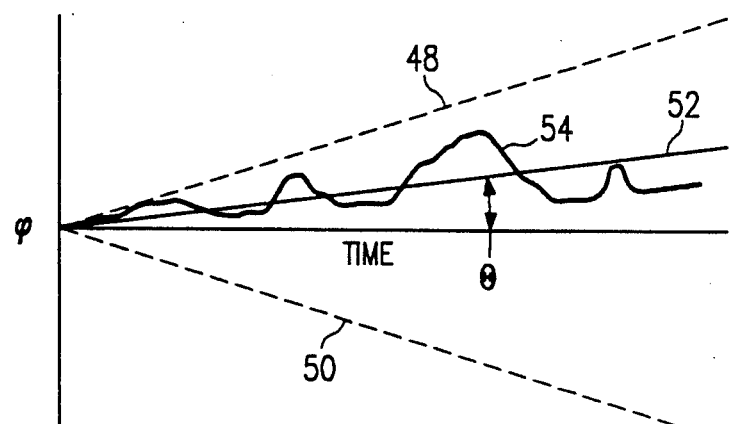
FIG. 3 illustrates a plot of composite phase over time.

Referring now to FIG. 3, there is illustrated a plot of the composite phase that is output from the EPROM 30 as a function of time. There are two dotted lines, a dotted line 48 with a positive slope and a dotted line 50 with a negative slope which represent the maximum boundaries for the carrier phase. This represents the operational boundaries of the DSP 26. In the preferred embodiment, if the difference between the frequency of the modulated carrier and the local carrier clock 16 is equal to 200 Hz, the carrier phase error will coincide with the dotted lines 48 and 50. However, if the frequency difference exceeds 200 Hz, the slope of the composite phase error will exceed the slope of the dotted lines 48 or 50. This will result in a command being transmitted back to the transmitter to make a course adjustment in the frequency.

The actual carrier phase error is represented by a solid straight line 52 which represents the median of the composite phase, represented by a curve 54. As will be described hereinbelow, once the carrier phase error as represented by straight line 52 is established, this can then be subtracted from the composite phase curve 54 to provide the recovered phase modulation. As will also be described hereinbelow, the carrier phase error could be converted to an analog value and input back to the local carrier clock 16 to provide a phase lock loop.

One of the difficulties in obtaining the curve 54 is that of determining absolute phase value in real time. Generally, phase can be determined from zero to ninety degrees, but the phase quadrant cannot easily be determined. The generation of the curve 54 is an important aspect of the present invention.

The system of the present invention works well with phase modulation but can also be utilized with frequency and phase/amplitude modulation. The most desirable phase modulation schemes are the ones that have repeating data patterns such as changing non-return to zero (NRZ) data. The worst case phase modulation schemes would be those wherein the phase seldom stops changing or seldom changes at all. One of the primary aspects of the present invention is to recognize where the regions of constant slope occur in the composite phase curve. In a conventional data pattern, the data will occupy more time at a data state than at a transition between data states, which transition is normally referred to as a "zero crossing". The zero crossing represents the point at which the data will typically make a transition between, for example, $+45°$ to $-45°$, crossing through $0°$ as it makes the transition. When it makes the transition from $+45°$ to $+135°$, the transition is through $90°$ which is also referred to as a zero crossing. Whenever the data is proximate to the bit center the rate of change in phase is small relative to a zero crossing. This results in a relatively constant slope in the curve 54 at this bit center, which constant slope is discriminated from the much higher slope of the zero crossings. Essentially, the first derivative of the composite phase is taken and compared with a slope threshold. This results in a plurality of line segments that are generally parallel to the solid line 52 with the average of these line segments comprising the solid line 52.

Figure 4:
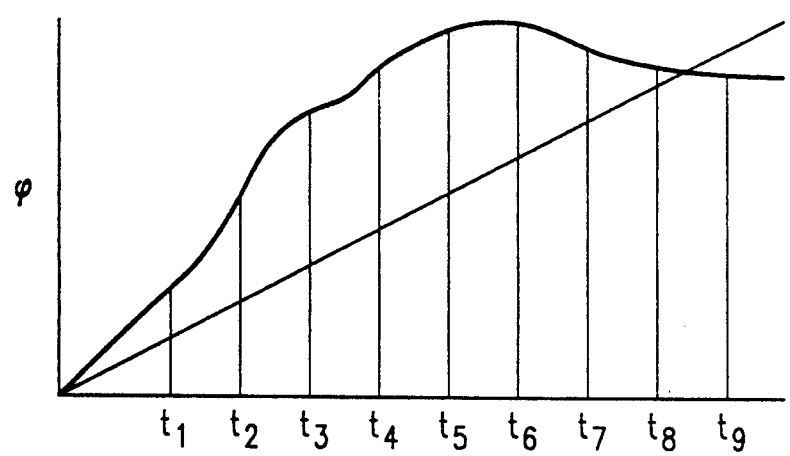
FIG. 4 illustrates a detailed plot of composite phase illustrating the sampling thereof.

Referring now to FIG. 4, there is illustrated a plot of the phase of a detailed portion of the curve 54 taken over multiple samples. These are referred to as subsamples taken from $t_1-t_9$. The sampling rate is higher than the bit rate by a factor of approximately five. However, it has been noted experimentally that the system will work with a sampling rate that is only two times as high as the bit rate. Each of the samples taken at $t_1-t_9$ corresponds to subsamples $s_1-s_9$. To generate the derivative, each of the subsamples $s_1-s_9$ is compared with the previous subsample and the difference therebetween generated. If this difference is constant, this indicates a constant slope.

Figure 5:
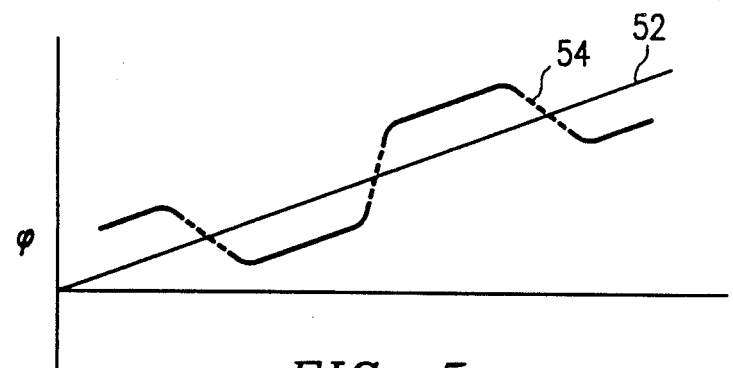
FIG. 5 illustrates a plot of phase over time for the portion of the composite phase above the slope threshold.

Referring now to FIG. 5, there is illustrated a detailed plot of representative data in the curve 54 wherein the portion of the curve 54 that is at a slope less than the slope threshold is represented in bold lines and the portion of the curve 54 that is above the slope threshold is represented in dotted lines. It can be seen, therefore, that the dotted lines represent the zero crossings.

Figure 6:
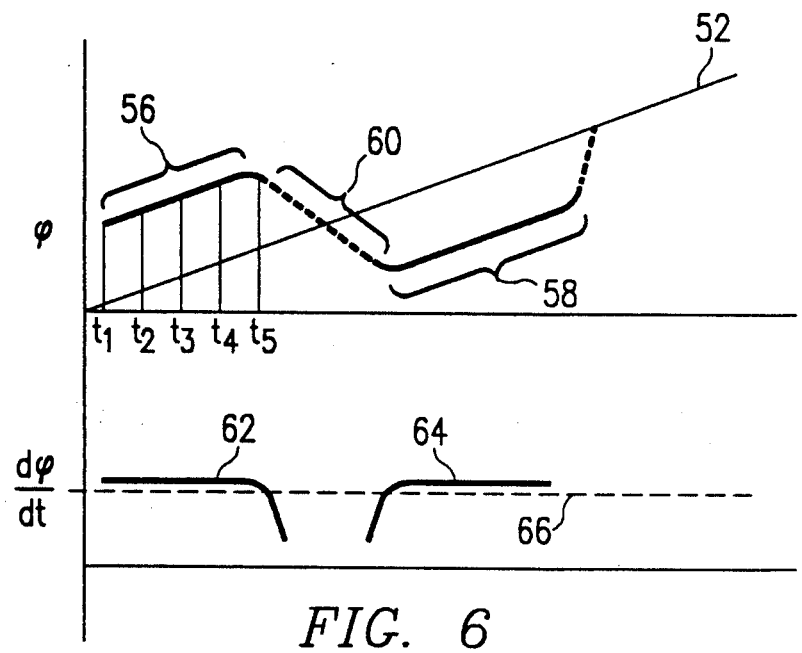
FIG. 6 illustrates a detail of the plot of FIG. 5 wherein the derivative of the composite phase below the slope threshold is illustrated.

Referring now to FIG. 6, there is illustrated a detail of the curve of FIG. 5 illustrating two bold lines 56 and 58 of the curve 54. The bold line portion 56 is above the solid line 52 and the bold line portion 58 is below the solid line 52. It can also be seen that there is a dotted line portion 60 that connects the end points of the bold line portion 56 and the bold line portion 58. The dotted line portion 60 represents the zero crossing. When the first derivative of the bold line portion 56 is taken, this results in a waveform segment 62 on the bottom curve in FIG. 6. In a similar manner, the first derivative of the bold line portion 58 is represented by a waveform segment 64. The average of the waveform segments 62 and 64 is represented by a dotted line 66, and this represents the first derivative of the solid line 52 or the average of the first derivatives of the bold line portions that represent portions of the curve 54 below the slope threshold.

In order for the bold line portions 56 and 58 to be discriminated from the dotted line portion 60 representing the zero line crossing, it is necessary for the phase to exist at any given state for a period of time that exceeds the time required for a zero crossing. However, the important feature that is implemented in the present invention is discriminating between zero line crossings and the center of the data bit. Once this discrimination has been made, the points representing the center of the data bit will be disposed about a baseline reference, which baseline reference represents the free-running phase difference between the modulated carrier and the local carrier clock. It is only necessary to average the data points which, in the present invention, are represented by the bold line portions 56 and 58 in FIG. 6, to determine the absolute phase error between the modulated carrier and the local carrier clock. This provides information by which to either phase lock the local carrier clock or for utilization with the DSP 26. Once the local carrier clock is phase locked or, alternatively, the free-running phase error is subtracted from the composite phase, the demodulated phase can be extracted. Thereafter, it is only necessary to recover the bit clock information from the demodulated phase.

Figure 7:
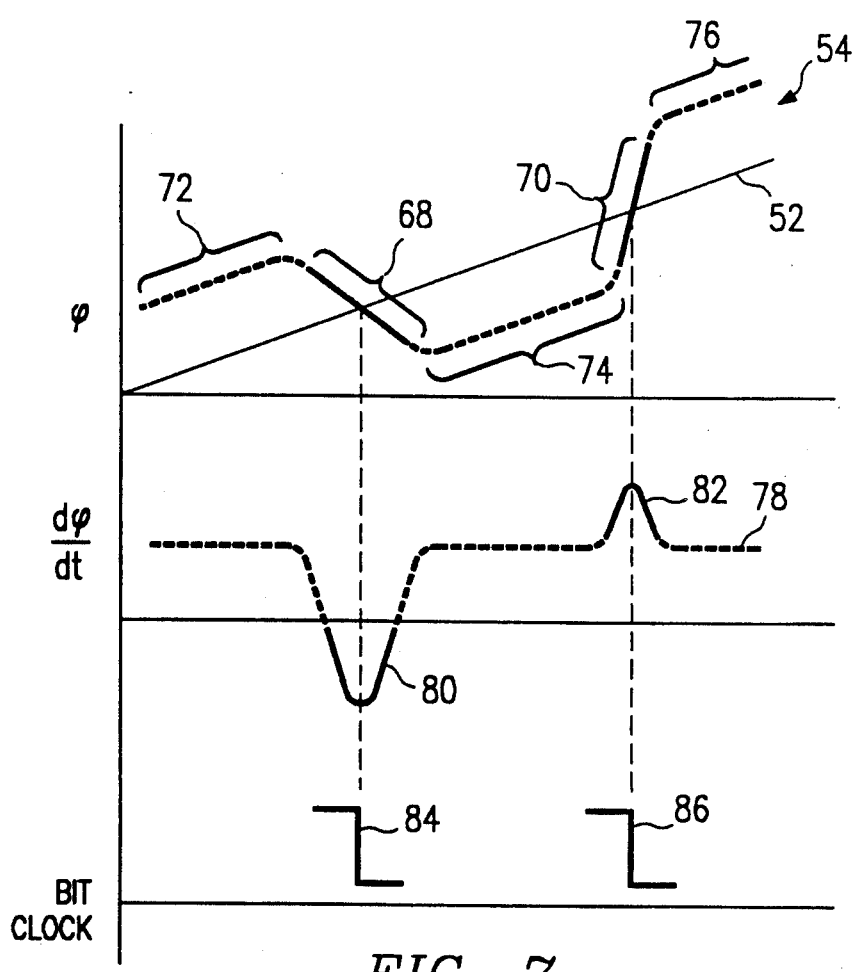
FIG. 7 illustrates a plot of the portion of the composite phase that is above the slope threshold and the derivative thereof in relation to the bit clock.

Referring now to FIG. 7, there is illustrated a portion of the curve 54 about the baseline 52 wherein the zero crossings of the waveform 54 are represented in bold lines. There are illustrated two bold line segments 68 and 70. These bold line segments 68 and 70 represent the portion of the curve 54 that has a slope exceeding the slope threshold. The bold line segment 68 is bound on either side by dotted line segments 72 and 74 with the bold line portion 70 being bounded on either side by the dotted line segment 74 and a dotted line segment 76. Dotted line segments 72–76 represent the portion of the curve 54 that has a slope that is below the slope threshold. The first derivative of the curve 54 is represented by a curve 78 and this curve is discriminated such that only the first derivative of slopes 68 and 70 is in bold lines and is utilized for the bit clock recovery scheme. The first derivative of the bold line portion 68 is represented by a bold line 80 and the first derivative of the bold line portion 70 is represented by bold line portion 82. It can be seen that the bold line portion 80 has a negative value representing the negative slope and the bold-line portion 82 is positive, representing a positive slope.

Under ideal circumstances, the zero crossing should occur at an edge of the bit clock. Therefore, it is only necessary to compare the occurrence of the zero crossing with the edge of the bit clock to determine if the bit clock is synchronized with the zero crossing. For example, in the preferred embodiment, the occurrence of the bold line portion 80 or the bold line portion 82 indicates that the bit clock recovery operation is to be performed, i.e., the waveform 54 is making a transition through a zero crossing of which there are four in a QPSK system, since it is a four phase system. Thereafter, the magnitude of the phase is then compared with the edge of bit clock to determine if the zero crossing on the curve 54 is coincident with the clock edge. For example, the zero crossing represented by the bold line portion 68 should be coincident with a clock edge 84 of the bit clock and the zero crossing represented by the bold line portion 70 should be coincident with a clock edge 86 of the bit clock.

Figure 8:
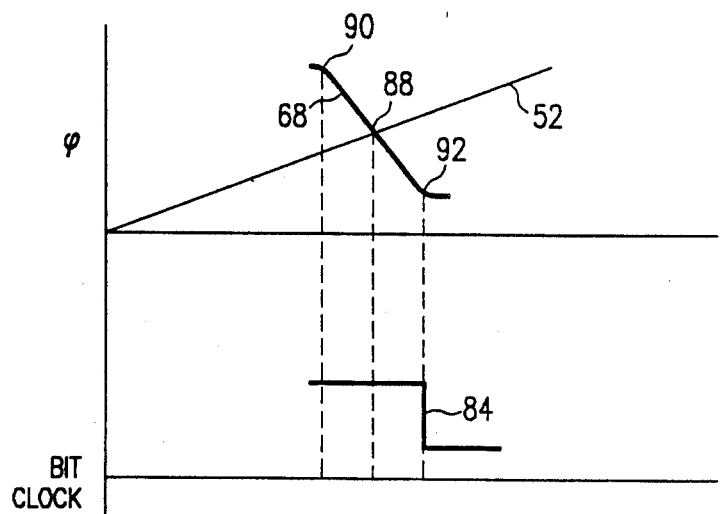
FIG. 8 illustrates a detail of the first derivative of the composite phase above the slope threshold relative to the edge of the bit clock.

Referring now to FIG. 8, there is illustrated a detail of the bold line portion 68 and the clock edge 84 of the bit clock. If the zero crossing of the bold line portion 80, as represented by a point 88, is coincident with the clock edge 84, no adjustment need be made to the bit clock. However, if the clock edge 84 occurs early, such that the magnitude of the phase, as represented by a point 90, is larger than the magnitude of the zero crossing at point 88, the frequency of the bit clock must be increased. Alternatively, if the clock edge 84 occurs late, as represented by a point 90 representing a magnitude that is less than the magnitude of the zero crossing at point 88, the frequency of the bit clock must be decreased. The condition wherein the clock edge 84 occurs coincident with the point 92 is represented in FIG. 8 by way of example. It can therefore be seen that the magnitude of the phase and the sign of the slope will indicate whether the clock has occurred early or late. For example, if the slope of the waveform signal 68 were positive, a higher magnitude would indicate that the clock had occurred late and not early. Therefore, it is necessary to have both the magnitude of the phase and the sign of the slope to determine whether the clock edge 84 has occurred early or late relative to the zero crossing.

Figure 9:
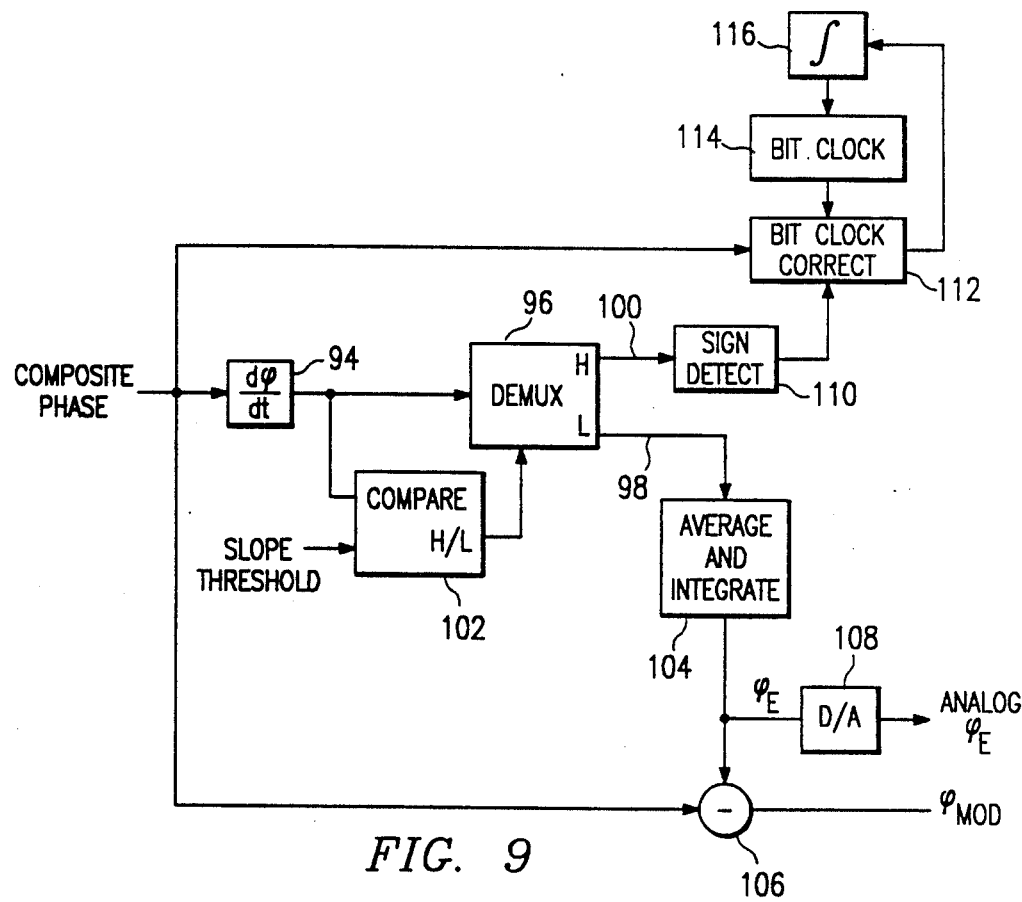
FIG. 9 illustrates a block diagram of a software implementation of the digital signal processor.

Referring now to FIG. 9, there is illustrated a block diagram of one embodiment of the software operation of the DSP 26 after calculation of the composite phase from the look-up table illustrated in FIG. 2a. It should be understood that although the present system utilizes a software based processor, the circuit can also be realized in hardware. The composite phase is input to a block 94 wherein the derivative $d\phi/dt$ is obtained. This is the first derivative of the composite phase. The derivative is then input to a demultiplexer 96, which selects the output of the block 94 for output on either a low output 98 or a high output 100. The demultiplexer 96 is controlled by a compare circuit 102, which compares the first derivative with a slope threshold and selects the low output 98 when the slope is below the slope threshold and selects the high output 100 when the slope is above the slope threshold. When the slope is below the slope threshold, the output 98 is input to an averaging circuit 104 that averages the segments. This represents the carrier phase error or the baseline reference, as indicated by the solid line 52. This average slope is integrated to obtain a representation of the baseline, 52. This reconstructed baseline is then input to a subtraction circuit 106, the other input of which is the composite phase. The output of the subtraction circuit 106 is phase modulation on the carrier. The carrier phase error can also be input to a digital/analog (D/A) converter 108 to provide an analog phase error voltage. This analog phase error voltage can be utilized to phase lock the local clock 16 with the carrier if desired.

For the bit clock recovery operation, the demultiplexer 96 is controlled to output a signal on the high output 100 for input to a sign detect circuit 110. The sign detect circuit 110 determines what the sign of the first derivative is and inputs this to a bit clock correct circuit 112. The bit clock correct circuit 112 operates only during the selection of a high output of the demultiplexer 96, which represents zero crossings, and is operable to receive both the composite phase and the output of a software bit clock generator 114, which is a software counter. The bit clock circuit 112 is then operable to compare the magnitude and sign of the composite phase to the edge of the bit clock 114 and then generate an error voltage. This error voltage is then integrated in an integrate circuit 116 for input back to the bit clock 114 to provide a correction signal therefore. It should be understood that the entire circuit of FIG. 9 is a representation of a software implementation in the DSP 26.

Figure 10:
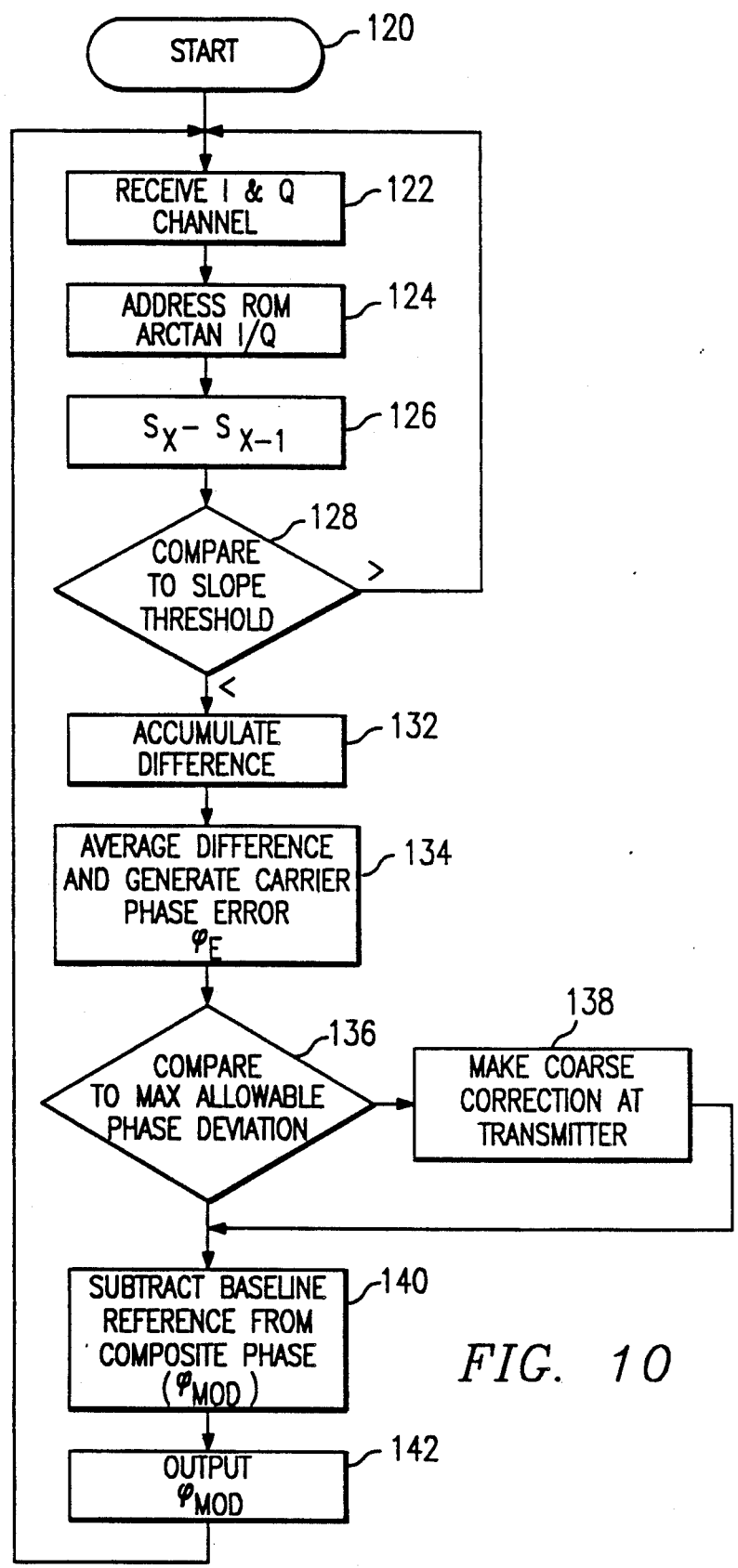
FIG. 10 illustrates a flow chart for detecting the modulated data.

Referring now to FIG. 10, there is illustrated a simplified flow chart for one embodiment of the operation of recovering the phase modulation from the carrier. The program begins at a start block 120 and then proceeds to a function block 122 wherein the I- and the Q-channel information is received from the A/D converters 24 and 22, respectively. The EPROM 30 is then addressed to generate the arctangent of the quantity "I/Q", as represented by function block 124. This quantity therefore represents a sample $s_x$. This is then subtracted from the previous sample $s_{x-1}$, as represented by function block 126. This represents the difference value. This difference value is then compared to the slope threshold, as indicated by a decision block 128. If the difference is greater than the slope threshold, the program returns to the input of function block 122 and, if the difference is less than the slope threshold, the program flows to a function block 132 to accumulate the difference. This difference is then averaged to generate the carrier phase error as represented by a function block 134. The program then flows to a decision block 136 to compare the average baseline with the maximum allowable baseline deviation. If the baseline reference exceeds the maximum allowable deviation, the program flows to a function block 138 indicating that a course frequency correction must be made at the transmitter end. The program then flows to a function block 140. Additionally, if the slope of the carrier phase error is less than the maximum allowable deviation, the program also flows to the function block 140.

The function block 140 indicates a step wherein the phase modulation is recovered from the carrier. In this step, the carrier phase error is subtracted from the composite phase, resulting in the phase modulation on the carrier. The recovered phase is then output as indicated by function block 142. The program then returns to obtain another sample.

Figure 11:
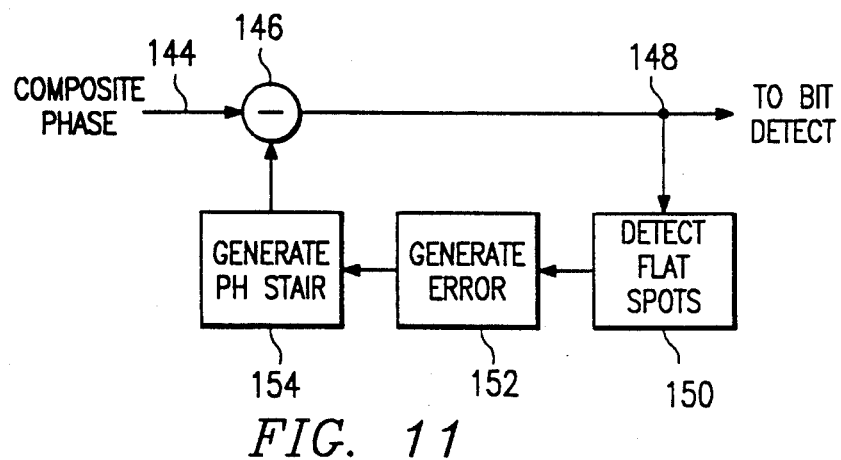
FIG. 11 illustrates a block diagram of the preferred embodiment for determining the carrier phase error.

Referring now to FIG. 11, there is illustrated a block diagram of a software implementation for the phase recovery operation in the preferred embodiment. The composite phase is received on an input line 144 and is input to a subtraction circuit 146, which composite phase is a digital value. The output of the subtraction circuit 146 provides the adjusted phase value which is input on a node 148 for output to the bit detect operation. The adjusted phase is input to a detection circuit 150 which is operable to detect flat spots. If flat spots are present, error is generated in a block 152 and then the phase stair is generated in a block 154. The phase stair is then input to the subtraction circuit 146, which phase stair value is generated from the composite phase. Therefore, the error generated in the block 152 is subtracted from the phase stair value to provide the phase slope, the phase slope being the difference between the values of the phase stair at different subsample times.

Figure 12A:
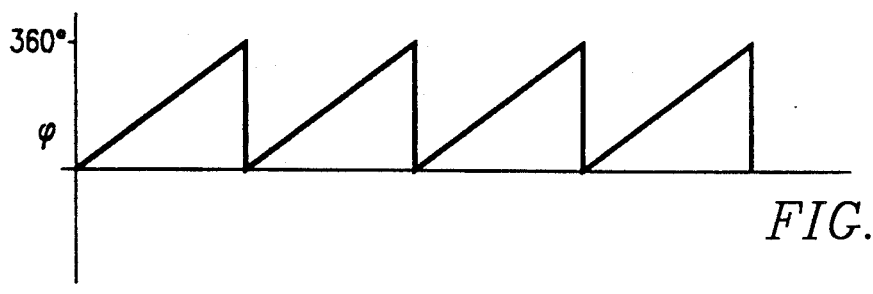
FIGS. 12a and 12b illustrate the generation of the carrier phase error stair.
Figure 12B:
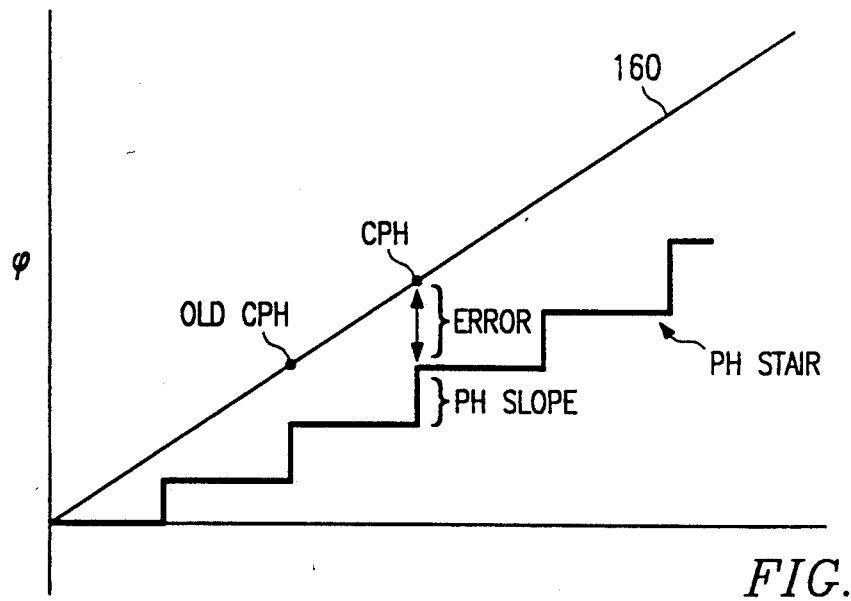

Referring now to FIGS. 12a and 12b, there are illustrated phase diagrams versus time. In FIG. 12a, the masked composite phase CPH is illustrated, which is output by the block 146. The phase varies from 0°–360°. For simplicity purposes, only the free-running carrier phase is illustrated with modulation removed resulting in straight lines. The phase error is essentially the angle that the carrier phase makes with the baseline. This angle would be 0° if the modulated carrier and the local carrier clock were locked.

In the preferred embodiment, an error signal is generated that represents the difference between the actual interface slope and a software generated slope. An adjustment is made to this error for each subsample until the error is approximately equal to zero. With reference to FIG. 12b, the internally generated slope is a staircase referred to as a PH Stair. The PH Stair has a slope defined by the height of each leg, which is referred to as the "PH Slope". The difference between the top of each leg of the PH Slope and a point on the PH line, defined by reference numeral 160, is the Error. Error provides a measure of the difference between the internally generated slope and the slope of the CPH line 160.

In order to determine where the non-zero crossing portions of the curve are, the difference between the two subsamples is calculated, which subsamples are referred to on the line by CPH and OLD CPH. If this difference is outside of a certain range, it indicates that the first derivative of the slope is greater than the slope threshold and, thus, is proximate to a zero crossing.

Figure 13:
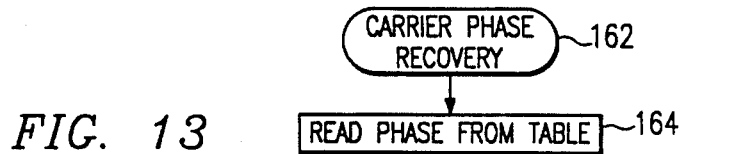
FIG. 13 illustrates a flow chart for the preferred method of recovering the phase from the modulated carrier.

Referring now to FIG. 13 there is illustrated a flow chart for the carrier phase correction operation illustrated in FIGS. 11 and 12a–12b. The program is initiated at a block 162 and then proceeds to a block 164 to read the phase from the phase table. The previously calculated value of the Phase Slope is then added to the old value of the Phase Stair to arrive at a new value for the Phase Stair, as indicated in function block 166. Initially, the value for the Phase Slope and the Phase Stair is equal to zero representing the initial receipt of data. For each subsample, the value of the Phase Stair is increased by the value of the Phase Slope. If there were no error and the composite phase value were a straight line at a constant slope, the value of the Phase Slope would be constant and a staircase would result. The program then flows to a block 168 to calculate the adjusted phase. The adjusted phase is equal to the difference between the actual composite phase and the phase stair value, this representing the error.

After calculation of the adjusted phase, the program proceeds to a decision block 170 to determine if the difference between the adjusted phase in the present subsample and the adjusted phase in the previous subsample is within range. Essentially, this decision block determines whether the slope is too steep, indicating that it is not a flat spot. If a flat spot is indicated, the program flows along the "Y" path to a function block 172 wherein the Error is set equal to the adjusted phase with the two most significant bits masked off. The program then flows to a decision block 174 to determine if the flat flag is on. The flat flag indicates that the last pass-through was a flat spot.

If the flat flag is on, the program proceeds along a "Y" path to a function block 176 to set the Rate equal to the difference between the error in the present sample time and the Old Error in the previous sample time. However, if the flat flag was not on, the program proceeds along an "N" path to a function block 178 to turn the flat flag on and then to a function block 180 to set the Rate equal to zero. Both function block 176 and function block 180 proceed to a function block 182 to set the Old Error value equal to the Error in the present sample time. The rate is a measure of the speed at which the error is decreasing and is utilized to determine how much of an adjustment in Phase Slope is necessary.

After determining the Rate, the program proceeds from the function block 182 to a function block 184 to increment the value of the Integrated Error by a factor K1 multiplied times the Error. The Integrated Error is utilized in calculating the Phase Slope.

After calculating the Integrated Error, the program flows to a decision block 186 to determine if the Integrated Error is within range. If not, the program flows along an "N" path to a function block 188 to clip the Integrated Error. If the Integrated Error is in range, the program flows along a "Y" path, the output of the function block 188 and the "Y" path both being input to a function block 190. The decision block 186 is operable to determine if the phase difference is too great, the purpose of clipping the integrated error is to prevent the value from exceeding the capacity of internal storage registers.

The function block 190 indicates the calculation of the Phase Slope which is set equal to the Integrated Error plus the Error multiplied by a constant K2 and also added with the Rate multiplied by a constant K3. As the system approaches lock, the value for Error and the value for Rate decrease such that the change in Phase Slope also decreases. Therefore, function block 190 provides a limitation on overshooting the final value of Phase Slope. This allows adjustment of the stability tradeoff between lock-on time and ringing.

Function block 190 flows to a decision block 192 which determines if the Phase Slope is within range. If not, the program flows to a function block 194 to clip the Phase Slope, and if not, the program flows along a "Y" path to the function block 200. The output of the function block 196 also flows to the input of the function block 196. The function block 196 indicates the updating of the Adjusted Phase Value. This Adjusted Phase Value is a value that results from subtracting the phase stair from the composite phase to determine the actual data phase value. The program then flows to a return block 198.

If the subsample occurs on a transition that is not a flat spot, the program will deviate at the decision block 170 along the N-path to a function block 200 to turn the flat flag off and then to the input of the function block 196. As described above, turning the flat flag off also results in the rate being set equal to zero on the next pass during which a flat spot is detected.

Figure 14:
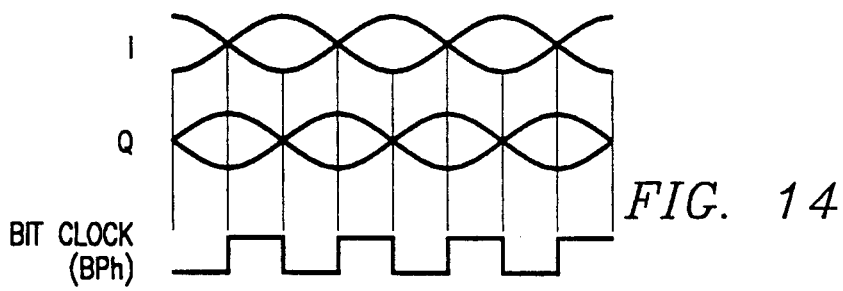
FIG. 14 illustrates a timing diagram for the I- and the Q-channel and the bit clock.
Figure 15:
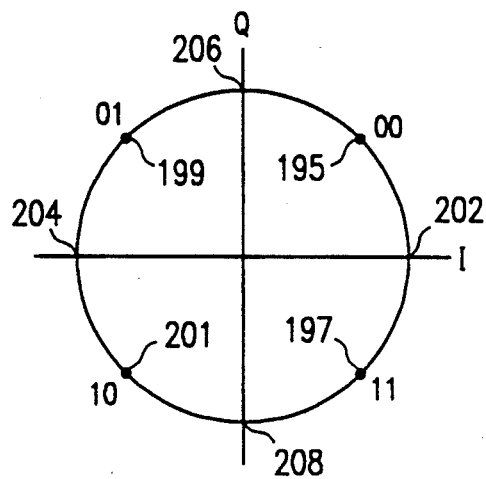
FIG. 15 illustrates a phasor diagram for the I- and the Q-channel.

Referring now to FIG. 14 there is illustrated a timing diagram for the relationship between the I-channel, the Q-channel and the bit clock. It can be seen that the zero crossings of the I-channel occur on the rising edge of the clock and the zero crossing of the Q-channel occur on the falling edges of the clock. The phasor diagram for this relationship is illustrated in FIG. 15. In this diagram, there are eight phase states representing data, they are +45°, represented by reference numeral 195, −45°, indicated by reference numeral 197, +135°, indicated by reference numeral 199, −135°, indicated by reference numeral 201 and in addition, the four zero crossings 0°, indicated by a reference numeral 202, −180°, indicated by a reference numeral 204, and +90° and −90°, indicated by reference numerals 206 and 208, respectively. However, the zero crossings do not represent flat spots.

To determine whether a zero crossing has occurred for purposes of synchronizing the bit clock, it is only necessary to determine if the quadrant of the data has changed and then determine which quadrant the data has changed to. In order to determine which quadrant the data is in, it is only necessary to have the first two most significant bits of the data, DPhB$\phi$ and DPhB1. For the point 195, the bits are "00", for the point 197, the bits are "11", for the point 199, the bits are "01", and for the point 201, the bits are "10". As will be described hereinbelow, to determine whether the Q-channel is a one or a zero, that is, whether it is ±90°, it is only necessary to look at the DB$\phi$ bit which is zero for +90° and one for −90°. With respect to the I-channel, to determine whether the bit is a one for 0° or a zero for −180°, it is only necessary to take the exclusive OR of DPhB$\phi$ and DPhB1.

Figure 16:
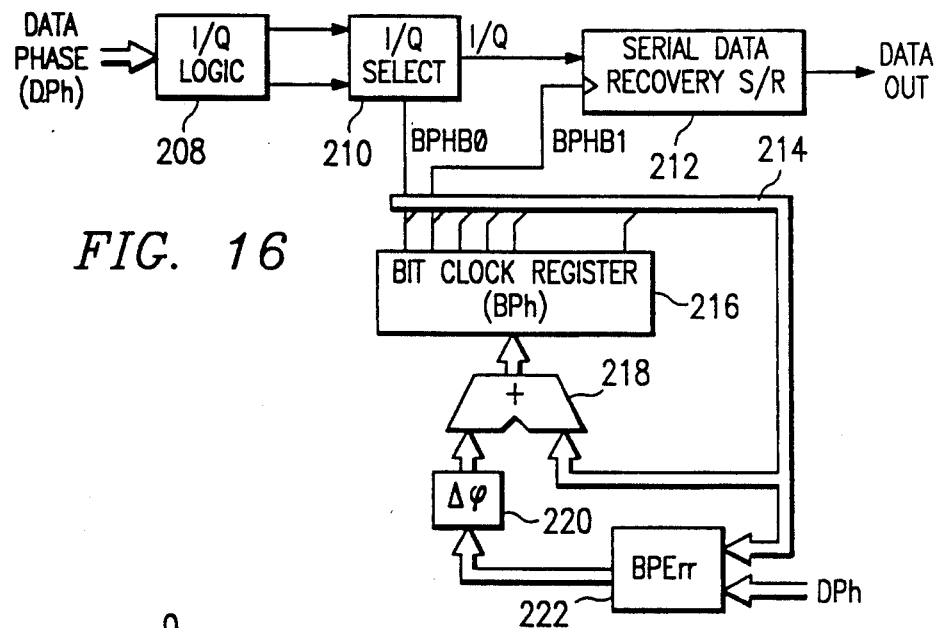
FIG. 16 illustrates a block diagram for the bit clock recovery scheme in the preferred embodiment.

Referring now to FIG. 16, there is illustrated a logic block diagram representative of the software implementation of the bit clock recovery scheme. The data phase (DPh) is input to an I/Q logic circuit 208. The I/Q logic circuit 208 performs the function described above wherein the data bit DPhB$\phi$ is input to one input of an inverter, the output of which comprises the Q data value and both DPhB$\phi$ and DPhB1 are input to two inputs of an exclusive NOR gate to output the I-channel. The I- and the Q-channel data are then input to an I/Q input circuit 210 which is controlled by the most significant bit in the bit clock, BPhB$\phi$. When BPhB$\phi$ goes from a low to a high, this indicates the bit center on the Q-channel and when the BDPhB$\phi$ goes from a high to a low, this indicates the data bit center of the I-channel. The selection is made and then output to a serial data recovery shift register 212 which is clocked by the bit BPhB1 in the bit clock. The shift register 212 provides the data output. The bit BPhB1 in the bit clock represents the actual bit clock whereas the bit BPhB$\phi$ is representative of the symbol clock.

The bit clock is generated and the digital value therefore stored in a bit clock register (BPh) 216 and the output thereof connected to a bus 216. The bits BPhB$\phi$ and BPhB1 are output to the I/Q select circuit 210 and the shift register 212, respectively. The bus is input to one input of the adder circuit 218, the other input of which is connected to the other output of a delta phase circuit 220 which determines the increment by which the bit clock register BPh is shifted for each sample clock. The delta is added with the output of the bit clock register 216 for every sample clock and then input back into the bit clock register 216 from the output of the adder 218. The output of the bit clock register 216 is compared with the zero crossings on the data phase signal in a BPErr circuit 222, the output of which provides the bit clock error signal. This is input to the delta phase circuit 220 and converted to an increment. The delta phase circuit 220 allows for adjusting the frequency of the bit clock if the clock edge of the bit clock does not coincide with the appropriate zero crossing.

Referring now to FIG. 17, there is illustrated a flow chart for the bit clock recovery scheme. The flow chart is initiated at a block 224 and then proceeds to a decision block 226. The decision block 226 determines whether the most significant bit of the bit clock is equal to the most significant bit of the bit clock at the previous subsample. This decision block 226 determines whether a transition has occurred since the most significant bit only changes at the rising or falling edge of the bit clock. If the transition has occurred, the program flows along a Y-path to a block 228 indicating that this is not a data bit. However, if they are not equal, this represents a transition and the program flows along an N-path to the decision block 230. The decision block 230 determines whether it is a positive or negative transition. If it is a positive transition, the program flows along a Y-path to a function block 232. This positive transition indicates the data bit center on the Q-channel and, essentially, the data bit Dbit is equal to the inverse of the adjusted phase data bit DPhB$\phi$. If a negative transition were present, the program would flow from the decision block 230 along the N-path to a function block 234. The negative transition is indicative of the data bit center for the I-channel and this data bit is determined by the Exclusive OR between the two most significant bits of the composite phase bits DPhB$\phi$ and DPhB1. The outputs of function blocks 232 and 234 are connected to the output of the block 228. The program then flows to the function block 236 wherein the old value for the bit clock Old DPh is set equal to the bit clock value BPh. That portion of the flow chart prior to the function block 236 is directed toward recovery of the data.

After recovery of the data, the program flows to a decision block 240 to determine if the second most significant of the composite phase DPhB1 is equal to the prior value thereof, Old DPhB1. This block is primarily directed toward determining if there has been a quadrant change. With reference to FIG. 15, it can be seen that the second MSB changes whenever the quadrant of the data changes between any of the points 194–200. If there has been a quadrant change, the program flows along the "N" path and if there has not been a quadrant change, the program flows along the "Y" path to a block 242 indicating that no zero crossing has occurred.

If there is quadrant change, the program flows along the N path to a decision block 244 to determine if the first MSB DPhB$\phi$ is equal to the old value for the MSB DPhB$\phi$. This block determines whether the zero crossing was over the X-axis relative to a 0° or a 180° crossing which corresponds to the "N" path from the decision block 244, or there has been a Y-axis crossing relative to ±90°, corresponding to the "Y" path from decision block 244. If the MSB of the composite phase has not changed, this indicates that the zero crossing has occurred over ±90°, indicating that the zero crossing relates to the I-channel. At function block 246, the bit clock error BPErr is set equal to the actual bit clock value minus the half-scale value of the digital bit clock value which, in the preferred embodiment, is the fixed value 8000.

If, on the other hand, the zero crossing was over the X-axis, indicating the Q-channel zero crossing, this should be coincident with the falling edge of the bit clock and the bit clock error is set equal to the value of the bit clock BPh in a function block 248. The error calculated in either block 246 or block 248 indicates the count difference between what the bit clock value should be at the zero crossing and what it actually is. This value is then input to a function block 250, which also receives on the input thereof the output of function block 242. Function block 250 sets the composite phase value equal to the old composite phase value Old DPh. The program then proceeds to the function block 252 to calculate a delta value for the bit clock which is equal to the old delta value minus the old bit clock error divided by a proportionality constant K1 and from this value is subtracted a rate factor such that, as the error decreases, the delta change also decreases. The program then proceeds to a function block 254 to set the bit clock to the old bit clock value plus the delta and also sets the bit clock error to the old bit clock error value. The program then proceeds to a return block 256 to return to the program.

It can be seen that the bit clock is therefore a counter that counts from zero to a maximum count value for each cycle of the bit clock with the MSB of the bit clock counter representing a positive transition and a negative transition. The output bit clock value at a zero crossing is compared with the expected value and then an error generated. The bit clock value is then adjusted in accordance with this error. This portion of the program of FIG. 17 is illustrated in FIG. 16 with respect to the bit clock register 216 and the adder 218, with the bit clock error circuit 222 and the delta phase circuit 220 providing the correction functions therefore.

When the difference frequency between the modulated carrier and the local carrier clock exceeds 200 Hz, it is possible that the error signal as described in the flow chart of FIG. 13 will never be reduced to zero, i.e., the system will not be within the capture range of the digital processor. In this condition, the data on the output is sampled to determine if it is recognizable. If no recognizable data is present, this is an indication that the system has not "locked up". The term locked up in this mode does not mean phase locking of the two carriers, but rather, a reduction of the carrier phase error to zero. Once it is determined that the system cannot lock up, then the frequencies of the modulated carrier and the local carrier clock are too far apart to allow capture. Therefore, the CPH Stair is then put at a higher value initially which will significantly reduce the error. Once the error is reduced to a valve within a "capture" range, the system will lock up. If the error is too large initially, it will clip and the system will never be able to capture the carrier phase. Therefore, this provision is necessary to allow the system to lock up with large deviations in frequency. Of course, as described above, this is compensated for by transmitting a signal back to the transmitting end as an indication of too large a frequency deviation. The transmitter then effects a change to correct this problem.

In order to correct the frequency at the transmitting end, the receiver detects an output from the DSP 26 indicating a large frequency deviation. This is encoded as a command for transmission back to the transmitter on a data channel. Although not described above, the system of the present invention is utilized in two-way communication systems for seismic telemetry. This seismic telemetry system is described in U.S. Pat. No. 4,745,628, assigned to Terra Marine Engineering, which patent is hereby incorporated by reference.

Figure 18:
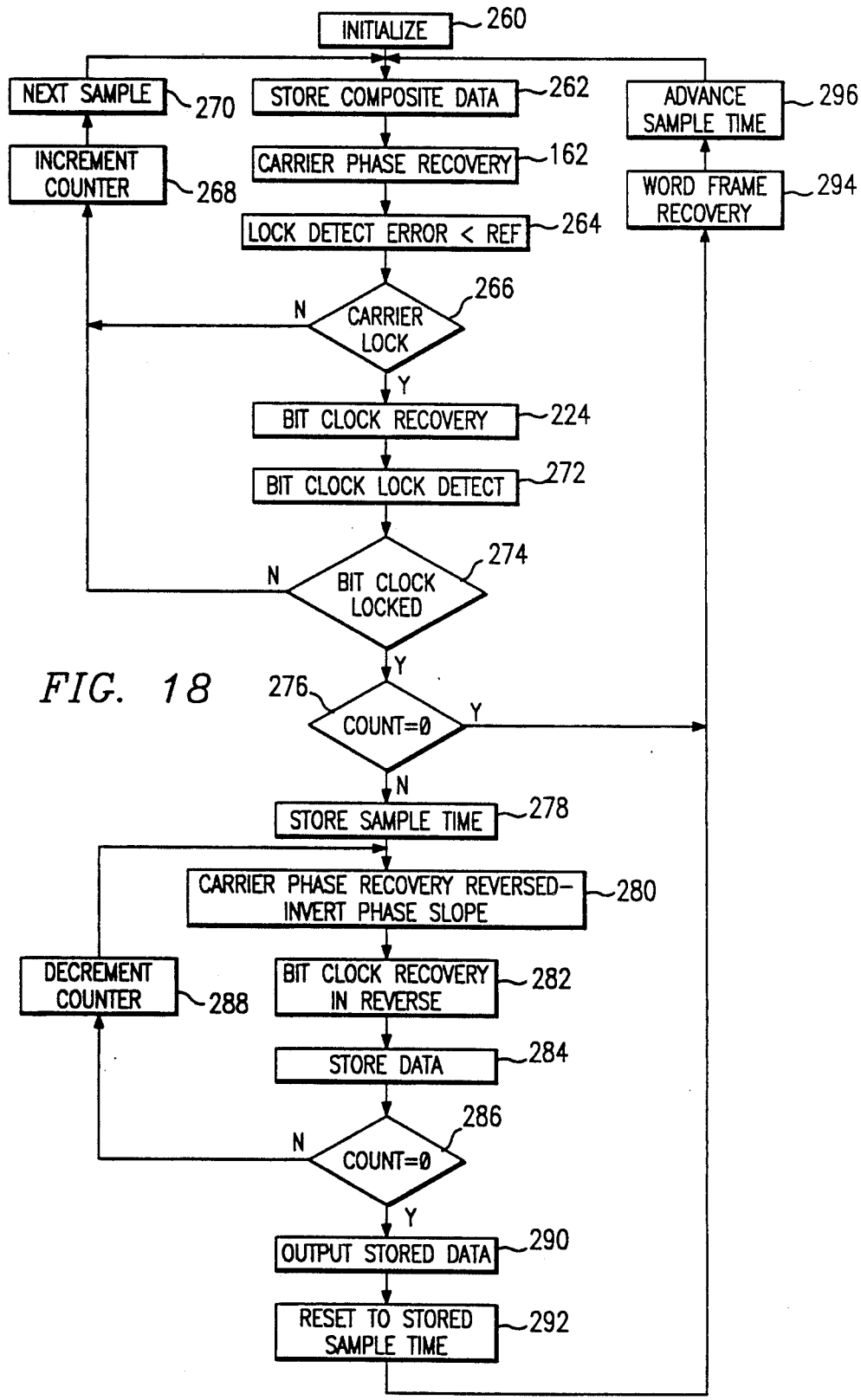
FIG. 18 illustrates a flow chart for the overall system.

Referring now to FIG. 18, there is illustrated a flow chart for the overall operation of the system illustrating the pseudo-zero lock time. The program is initialized in the block 260 wherein the value of the Phase Slope, the Phase Stair and the Old Error is set equal to zero. The program then flows during a first subsample time to a function block 262 wherein the composite data is stored. The program then flows to the Carrier Phase Recovery subroutine 162 to determine the Phase Slope and the Adjusted Phase. The program then flows to a function block 264 to perform a Lock Detect function. The Lock Detect function is essentially a comparison of the Error with a reference. If the Error is too large, this indicates that the system is not locked. The program then flows to a function block 266 to determine if there is carrier phase lock. If not, the program flows to the input of a function block 268 along an "N" path to increment an internal software counter. The program then flows to a function block 270 to go to the next subsample time and then back to the input of the function block 262. This will continue until carrier lock is achieved at which time the program will flow from the decision block 266 along a "Y" path to the bit clock recovery subroutine 224 of FIG. 17. The program then flows to a function block 272 to determine if there is Bit Clock lock. This is determined by comparing the DPh value at function block 250 in the flow chart of FIG. 17 with a reference value and determining if the Delta Phase is less than a predetermined reference. If so, this indicates lock of the bit clock. At a decision block 274, the path will proceed along an "N" path if the bit clock is not locked to the input of function block 268 to increment the software counter and, if the bit clock is locked, the program flows along a "Y" path to a decision block 276.

The decision block 276 determines if the value of the software counter is equal to zero. If it is not equal to zero, this indicates that there is stored composite data that was received prior to the carrier and bit clock being locked. If this is the case, this data must either be discarded or recovered. In order to recover this information, the program flows along an "N" path to a function block 278 to store the sample time at which the program branched along the "N" path and into a function block 280 to perform the carrier phase recovery of the flow chart in FIG. 13 in reverse. This essentially requires the phase slope to be inverted in value and for the composite data that was stored in function block 262 to be extracted in reverse. For example, if composite data were stored for fifteen subsamples prior to obtaining system lock, the system would invert the value for the Phase Slope on the initial pass through the Carrier Phase Recovery program 162 and then sequentially extract the previously stored value by first accessing the stored composite data for subsample fourteen, then for subsample thirteen, etc., until the initial composite data for the first subsample was accessed. During each access of a subsample in reverse, the program also flows through a function block 282 to perform the bit clock recovery subroutine of function block 224 in reverse which will result in the synchronizing of the bit clock and also in outputting data. This data is stored in an internal memory, as indicated by the function block 284 and then the program flows to a decision block 286 to determine if the count value is equal to zero. If not, the program flows to the input of a function block 288 to decrement the value in the software counter and then back to the input of the function block 280. The loop from the output of function block 278 and along the "N" path from the decision block 286 continues until the count value is equal to zero. However, the program will process this loop until the counter is decremented during one subsample time. If the digital signal processor utilized requires more time to process back through the accumulated samples prior to obtaining lock, interrupts can be utilized and the next value of the composite phase can be processed utilizing appropriate interrupts and the data pipelined.

After the counter has been decremented to zero in the function block 288, this indicates that all of the data that was accumulated during lock up of the system has now been recovered and stored. The program then flows along the "Y" path from the decision block 286 to a function block 290 to output the stored data that was recovered and the program flows to a function block 292 to reset the sample time to the stored sample time in function block 278. This effectively returns the system to the point at which the system was locked, including the value of the Phase Slope, the Error and the Phase Stair.

After the system is locked up, the program flows to a function block 294 to perform a word-frame recovery and then to a function block 296 to advance to the next sample time. The program also flows back to the input of the function block 262 to continue processing data.

Figure 19:
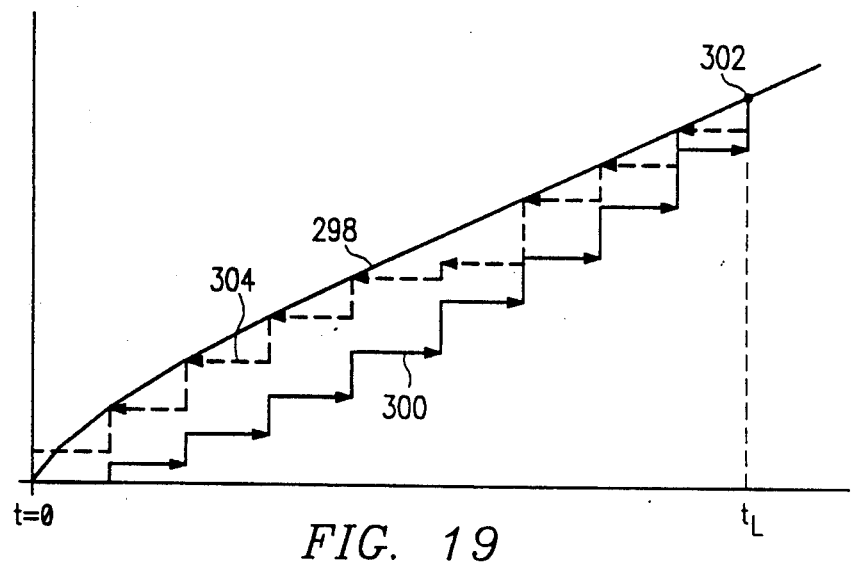
FIG. 19 illustrates a timing diagram for pseudozero lock time.

Referring now to FIG. 19, there is illustrated a diagram of the composite phase over time from an intializing time $t_o$ when the lock up procedure is initiated to a time $t_L$ which indicates lock up. The composite phase is illustrated by a solid curve 298. During the initial lock up time, the Phase Stair is represented by a solid plot 300 wherein the value of the Phase Stair approximately equals the value of the composite phase on the value of curve 298 at the time $t_L$ and at a point 302. At the point 302, the carrier phase recovery subroutine is performed in reverse, as indicated by a dotted plot 304. The purpose of stepping back from the carrier phase recovery is to account for minor errors in the composite phase.

Figure 20:
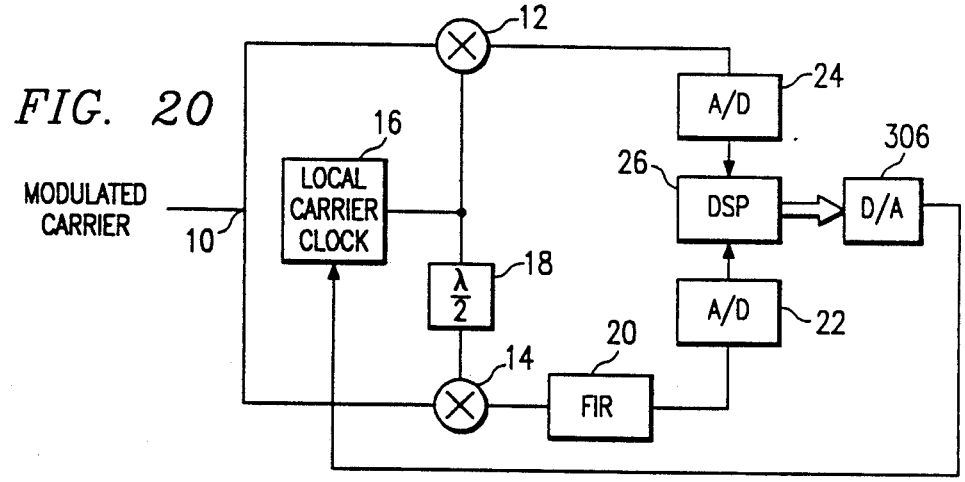
FIG. 20 illustrates an alternate embodiment of the demodulator of FIG. 1 wherein the phase error is fed back to the local oscillator clock to provide phase lock.

Referring now to FIG. 20, there is illustrated a block diagram of an alternate embodiment of the present invention wherein the local carrier clock 16 is phase locked to the received carrier voltage. The output of the DSP 26, representing the phase error is input to a D/A converter 306, the output of which provides an analog phase error voltage. This is then input to the local carrier clock and can be filtered if necessary. This could be utilized to either provide a course frequency correction for the local carrier clock 16 in order to bring it within the limits of the DSP 26 operation or it could be utilized to provide a true phase lock of the local carrier clock 16 with the carrier frequency.

Figure 21:
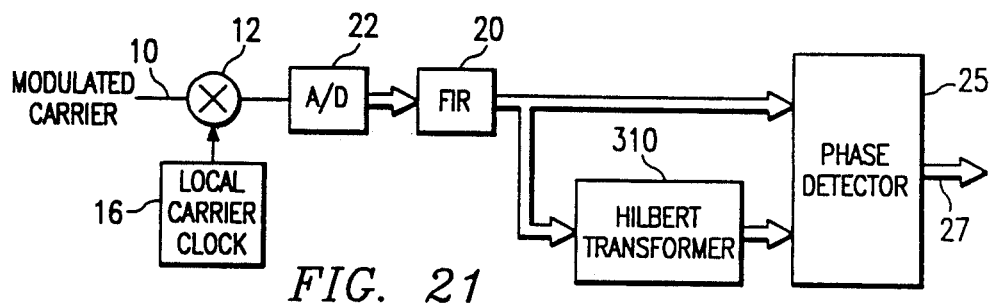
FIG. 21 illustrates an alternate embodiment of the present invention utilizing a Hilbert transform.

Referring now to FIG. 21, there is illustrated an alternate embodiment of the present invention. The output of the FIR filter 20, described with respect to FIG. 1, outputs the fundamental value of the signal representing the real component x(t). In this embodiment, the output of the FIR filter is also input to a Hilbert transform circuit 310 that is operable to recover the imaginary component y(t) from the real component x(t). This procedure is well-known in the art. Generally, the time dependent complex variable signal is referred to as having a real part and an imaginary part, the imaginary part providing the quadrature of the real part. The quadrature is obtained by taking a Hilbert transform of the real part by the following equation:

$$y(t) = \frac{1}{\pi t} * x(t) \qquad (1)$$

where y(t) = quadrature
x(t) = signal
and $$u(t) = x(t) + iy(t) \qquad (2)$$

Once u(t) is computed, it can be expressed in polar form as:

$$u(t) = R(t)exp[i\phi(t)], \qquad (3)$$

where $$R(t) = [x^2(t) + y^2(t)]^{\frac{1}{2}} \quad (4)$$

and $$\phi(t) = arctan[y(t)/x(t)] \quad (5)$$

Here, $R(t)$ represents instantaneous amplitude and $\phi(t)$ represents instantaneous phase. Instantaneous phase can be computed with the following alternative approach. Taking the logarithm of both sides of Equation (4), the resulting equation is:

$$ln\ u(t) = ln\ R(t) + i\phi(t) \quad (6)$$

so that $$\phi(t) = Im\ [ln\ u(t)] \quad (b\ 7)$$

It can be seen that the only requirement for attaining the quadrature component of the signal x(t) is to take the Hilbert transform. The use of the phase splitter with reference to FIG. 1 provides a Hilbert transform. However, this is realized in the hardware in the embodiment of FIG. 1. The present system utilizes a digital signal processor as the Hilbert transform filter 310 to perform the calculation.

In summary, there has been provided a demodulation and carrier recovery system. In this system, the composite phase difference between a received carrier and a local carrier clock is first determined, which is a combination of the free-running phase between the local clock and the carrier. The composite phase is then discriminated to determine the free-running phase error. Once the free-running phase is determined, it is subtracted from the composite phase to yield the phase modulation on the carrier.

Although the preferred embodiment has been described in detail, it should be understood that various changes, substitutions and alterations can be made therein without departing from the spirit and scope of the invention as defined by the appended claims.

What is claimed is:

1. A method for demodulating a phase modulated carrier, comprising:
    receiving the phase modulated carrier with the phase modulated carrier operating at a first frequency;
    generating a local carrier clock at a second frequency, the second frequency proximate in frequency to the first frequency, the frequency of the local carrier clock independent of the received carrier;
    determining the phase difference as a function of time between the phase modulated carrier and the local carrier clock to provide a composite phase signal comprising the phase modulation on the phase modulated carrier and the free running phase difference between the modulated carrier and the local carrier clock;
    discriminating the free-running phase from the composite phase signal to provide a phase error signal, which phase error signal is a function of time;
    subtracting the phase error signal from the composite phase signal to provide the phase modulation on the phase modulated carrier;
    generating a bit clock;
    determining when the zero crossings in the phase modulation occur, the zero crossings corresponding to data transitions; and
    synchronizing the clock edges of the bit clocks to the zero crossings of the phase modulation.

2. The method of claim 1 wherein the phase modulation is quadrature phase modulation and the step of determining the phase difference comprises:
    delaying the local carrier clock by 90° to provide a phase delayed local carrier clock;
    mixing the local carrier clock and the phase modulated carrier to downconvert the phase modulated carrier to an intermediate frequency to provide an I-channel;
    mixing the delayed local carrier clock and the phase modulated carrier to downconvert the phase modulated carrier to the intermediate frequency to provide a Q-channel, the Q-channel shifted in phase 90° relative to the I-channel; and
    calculating the arctangent of the quotient of the magnitude of the I-channel and the magnitude of the Q-channel to provide the composite phase signal.

3. The method of claim 2 wherein the composite phase value is a digital value and the step of calculating the arctangent of the quotient of the I-channel phase value and the Q-channel phase value comprises:
    storing the values of arctan I/Q for predetermined magnitudes of the I- and Q-channels and each stored value addressable by a predetermined address;
    converting the magnitudes of the I- and Q-channels to a digital address, which digital address corresponds to one of the stored arctan I/Q values; and
    accessing the corresponding one of the stored arctan I/Q values for output of the composite phase signal.

4. The method of claim 1 wherein the step of discriminating the free-running phase from the composite phase signal comprises:
    generating the first derivative of the composite phase signal;
    comparing the first derivative of the composite phase value with a predetermined slope threshold; and
    generating the average value of the portion of the composite phase signal having a first derivative that is less than the predetermined slope threshold, the average value comprising the phase error.

5. The method of claim 1 wherein the bit clock is a software counter having a digital value on the output thereof and the step of synchronizing the clock edges comprises:
    measuring the value of the bit clock at the zero crossing;
    subtracting the measured value from the expected value to generate an error signal; and
    adjusting the frequency of the bit clock by said error.

6. The method of claim 1 and further comprising:
    comparing the absolute value of the phase error with a predetermined threshold; and
    generating a frequency error signal whenever the absolute value of the phase error signal exceeds the predetermined threshold, the frequency error signal indicating that the frequency difference between the phase modulated carrier and the local clock is larger than a predetermined value.

7. The method of claim 1 wherein the step of discriminating the free running phase from the composite phase signal to provide the phase error signal;
    generating a reference phase error signal;
    subtracting the composite phase signal from the reference phase error signal to provide an instantaneous error signal;

varying the reference phase error signal until the instantaneous error signal is less than a predetermined threshold indicating carrier lock; and the reference phase error signal equal to the phase error signal after obtaining carrier lock.

8. The method of claim 7 and further comprising:

storing the portion of the composite phase signal that is generated during the time that the instantaneous error exceeds the predetermined threshold; and subtracting the value of the phase error signal at the point in time that the instantaneous error signal was less than the predetermined threshold from the composite phase signal to provide the phase modulation on the phase modulated carrier during the period of time that carrier lock was not present, and the composite phase signal was generated.

9. A method for demodulating a phase modulated carrier, comprising:

receiving the phase modulated carrier with the phase modulated carrier operating at a first frequency;

generating a local carrier clock at a second frequency, the second frequency proximate in frequency to the first frequency, the frequency of the local carrier clock independent of the received carrier;

determining the phase difference as a function of time between the phase modulated carrier and the local carrier clock to provide a composite phase signal comprising the phase modulation on the phase modulated carrier and the free running phase difference between the modulated carrier and the local carrier clock by the steps of:

computing the quadrature component of the signal by a Hilbert transform filter to provide the quadrature channel as the Q-channel that is 90° shifted in phase relative to the input signal which comprises the I-channel, and calculating the arctangent of the quotient of the magnitude of the I-channel and the magnitude of the Q-channel to provide the composite phase signal;

discriminating the free-running phase from the composite phase signal to provide a phase error signal, which phase error signal is a function of time; and subtracting the phase error signal from the composite phase signal to provide the phase modulation on the phase modulated carrier.

10. A system for demodulating a phase quadrature modulated carrier, comprising:

receive circuitry for receiving the phase modulated carrier with the phase modulated carrier operating at a first frequency;

a local clock for generating a local carrier clock operating at a second frequency, said second frequency proximate in frequency to said first frequency and independent of said first frequency;

means for determining the phase difference as a function of time between the phase modulated carrier and said local carrier clock to provide a composite phase signal, said composite phase signal comprised of the phase due to phase modulation on the phase modulated carrier and the free-running phase difference between the modulated carrier and said local carrier clock, said means for determining including:

a first phase detector for determining the difference between the phase modulated carrier and said local carrier clock to provide an I-channel phase value, a first down converter for mixing the local carrier clock and phase modulated carrier to downconvert the phase modulated carrier to an intermediate frequency to provide an I-channel, a Hilbert transform filter for receiving the I-channel and computing the quadrature phase value thereof as a Q-channel, said Q-channel shifted in phase 90° relative to said I-channel, and p2 means for calculating the actangent of the quotient of the magnitude of said I-channel and the magnitude of said Q-channel to provide said composite phase signal;

means for discriminating the free-running phase from the composite phase signal to provide a phase error, which phase error signal is a function of time; and a subtraction circuit for subtracting the phase error signal from said composite phase signal to provide the phase modulation on the phase modulated carrier.

11. A system for demodulating a phase modulated carrier comprising:

receive circuitry for receiving the phase modulated carrier with the phase modulated carrier operating at a first frequency;

a local clock for generating a local carrier clock operating at a second frequency, said second frequency proximate in frequency to said first frequency and independent of said first frequency;

means for determining the phase difference as a function of time between the phase modulated carrier and said local carrier clock to provide a composite phase signal, said composite phase signal comprised of the phase due to phase modulation on the phase modulated carrier and the free-running phase difference between the modulated carrier and said local carrier clock;

means for discriminating the free-running phase from the composite phase signal to provide a phase error, which phase error signal is a function of time;

a subtraction circuit for subtracting the phase error signal from said composite phase signal to provide the phase modulation on the phase modulated carrier;

a bit clock;

circuitry for determining when the zero crossings in the phase modulation on aid carrier occur, the zero crossings corresponding to data transitions; and circuitry for synchronizing the clock edges of said bit clock to the zero crossings of the phase modulation.

12. The system of claim 11 wherein the phase modulation on the phase modulated carrier comprises quadrature phase modulation and said means for determining comprising:

a delay circuit for delaying said local carrier clock by 90° to provide a phase delayed carrier clock;

a first phase detector for determining the phase difference between the phase modulated carrier and said local carrier clock to provide an I-channel phase value;

a first downconverter for mixing the local carrier clock and phase modulated carrier to downconvert the phase modulated carrier to an intermediate frequency to provide an I-channel;

a second downconverter for mixing said delayed local carrier clock and phase modulated carrier to downconvert the phase modulated carrier to said intermediate frequency to provide a Q-channel, said Q-channel shifted in phase 90° relative to said I-channel; and means for calculating the arctangent of the quotient of the magnitude of said I-channel and the magnitude of said Q-channel to provide said composite phase signal.

13. The system of claim 12 wherein said composite phase value is a digital value and said means for calculating the arctangent comprises:

a memory having a plurality of storage locations each for storing a value of the arctan I/Q for a predetermined magnitude of said I-channel signal and a predetermined magnitude of said Q-channel signal, each of said stored locations addressable by a predetermined address;

conversion means for converting the magnitudes of the signals on said I- and Q-channels to a digital address, which digital address corresponds to one of said stored locations in said memory; and means for accessing the corresponding one of said stored arctan I/Q values for output of said composite phase signal.

14. The system of claim 11 wherein said means for discriminating comprises:

a discriminator for discriminating between data transitions and non-data transitions in the composite phase signal; and means for averaging the non-data transitions to provide the free-running phase difference between said local carrier clock and the phase modulated carrier that comprises the phase error.

15. The system of claim 14 wherein said discriminator comprises:

sampling circuitry for sampling the composite signal at a rate higher than the occurrence of non-data transitions in said composite phase signal;

difference means for determining the difference between adjacent samples to find the slope therebetween; and compare means for comparing the slope between adjacent samples with a predetermined slope threshold, said non-data transitions defined as the portion of said composite phase signal having a slope between adjacent ones of said samples that is less than said predetermined slope threshold.

16. The system of claim 11 wherein said means for discriminating comprising:

means for generating a reference phase error signal;

means for subtracting the phase error signal from said reference phase error signal to provide an instantaneous error signal; and means for varying said reference phase error signal until said instantaneous error signal is less than the predetermined threshold indicating carrier lock;

said reference phase error signal equal to said phase error signal after obtaining carrier lock.

17. The system of claim 16 and further comprising:

means for storing the portion of the composite phase signal that is generated during the time that said instantaneous error signal exceeds the predetermined threshold;

said subtraction circuit operable to subtract the value of said phase error signal determined upon obtaining carrier lock from said composite phase signal to provide the phase modulation on the phase modulated carrier during the time that said instantaneous error signal exceeded the predetermined threshold.

* * * * *